(12) United States Patent
Jenne et al.

(10) Patent No.: US 10,459,733 B2
(45) Date of Patent: Oct. 29, 2019

(54) POWER BUDGETING IN AN INFORMATION HANDLING SYSTEM

(71) Applicant: DELL PRODUCTS, LP, Round Rock, TX (US)

(72) Inventors: John E. Jenne, Austin, TX (US); Kyle E. Cross, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 91 days.

(21) Appl. No.: 15/880,058

(22) Filed: Jan. 25, 2018

(65) Prior Publication Data
US 2019/0227616 A1 Jul. 25, 2019

(51) Int. Cl.
G06F 9/44 (2018.01)
G06F 1/32 (2019.01)
G06F 9/4401 (2018.01)
G06F 1/3206 (2019.01)

(52) U.S. Cl.
CPC .......... G06F 9/4401 (2013.01); G06F 1/3206 (2013.01); G06F 9/4406 (2013.01)

(58) Field of Classification Search
CPC ..... G06F 9/4401; G06F 9/4406; G06F 1/3206
See application file for complete search history.

(56) References Cited

U.S. PATENT DOCUMENTS

| 7,457,976 B2 * | 11/2008 | Bolan ................. G06F 1/263 713/300 |
| 7,996,690 B2 | 8/2011 | Shetty et al. |
| 8,060,760 B2 | 11/2011 | Shetty et al. |
| 9,336,106 B2 * | 5/2016 | Phuong ................. G06F 1/26 |
| 2010/0017630 A1 * | 1/2010 | Chen ................. G06F 1/189 713/300 |
| 2014/0052309 A1 | 2/2014 | Chandrasekhar et al. |
| 2015/0177780 A1 | 6/2015 | Anderson et al. |
| 2018/0307288 A1 * | 10/2018 | Huang ................. G06F 1/3203 |

\* cited by examiner

*Primary Examiner* — Stefan Stoynov
(74) *Attorney, Agent, or Firm* — Larson Newman, LLP (57) ABSTRACT

A halt event separates a boot up operation from a run time operation. A controller grants a request from a baseboard management controller for an electrical power associated with a boot-up operation. As the baseboard management controller completes the boot-up operation (such as a power on self-test), the baseboard management controller predicts the electrical power that is required for a run time operation (e.g., executing an operating system). The baseboard management controller is then required or forced to submit a subsequent request for the additional electrical power that is required for the run time operation. The controller compares the electrical power predicted for the run time operation to a power availability from a power supply (such as a safe or maximum operating condition). If the power supply can provide the electrical power predicted to be required during the run time operation, then the controller may permit or authorize a transition from the boot up operation to the run time operation. However, if the power supply cannot provide the electrical power predicted to be required during the run time operation, then the controller denies the run time operation.

20 Claims, 11 Drawing Sheets

POWER BUDGETING IN AN INFORMATION HANDLING SYSTEM

FIELD OF THE DISCLOSURE

The present disclosure generally relates to information handling systems, and more particularly relates to power budgeting in a server ecosystem.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A chassis management controller is responsible for powering on multiple information handling system nodes if sufficient power supply unit capacity is installed in the chassis. Each information handling system node contains a baseboard management controller which collects local configuration inventory, performs calculations, and communicates the results to the chassis management controller. The chassis management controller allows the initial boot up of an individual information handling system by comparing a stored boot power value provided by the baseboard management controller to available power supply capacity in the chassis. The baseboard management controller then establishes a halt event that separates a boot up operation from a run time operation. Power consumption of the information handling system is held at an electrical power limit below the available capacity of the installed power supply units (PSUs) during the boot up operation. As the boot up operation is performed, the baseboard management controller inventories hardware components and predicts the electrical power that will be required from the power supply unit during the run time operation. When the baseboard management controller logically encounters the halt event such as at a logical end of a power on self-test or "POST", the information handling system does not enter the run time operation. Instead, the baseboard management controller communicates the information handling systems required run time power consumption to the chassis management controller. The chassis management controller then performs a power management check. That is, the chassis management controller compares the electrical power predicted for this information handling system node plus the power capacity already in use to a threshold value such as a safe or maximum operating power condition. If the power supply unit can provide the electrical power predicted to be required during the run time operation, then the chassis management controller may permit or authorize the baseboard management controller to allow the information system to transition from the boot up operation to the run time operation. However, if the power supply unit cannot provide the electrical power predicted to be required during the run time operation, then the chassis management controller may deny the transition to the run time operation, in which case the baseboard management controller will halt the transition to run time operation by the information handling system. The chassis management controller and baseboard management controller(s) thus work together to safely confine or hold a computer, server, or other information handling system in the boot up operation without overtaxing the power supply unit.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
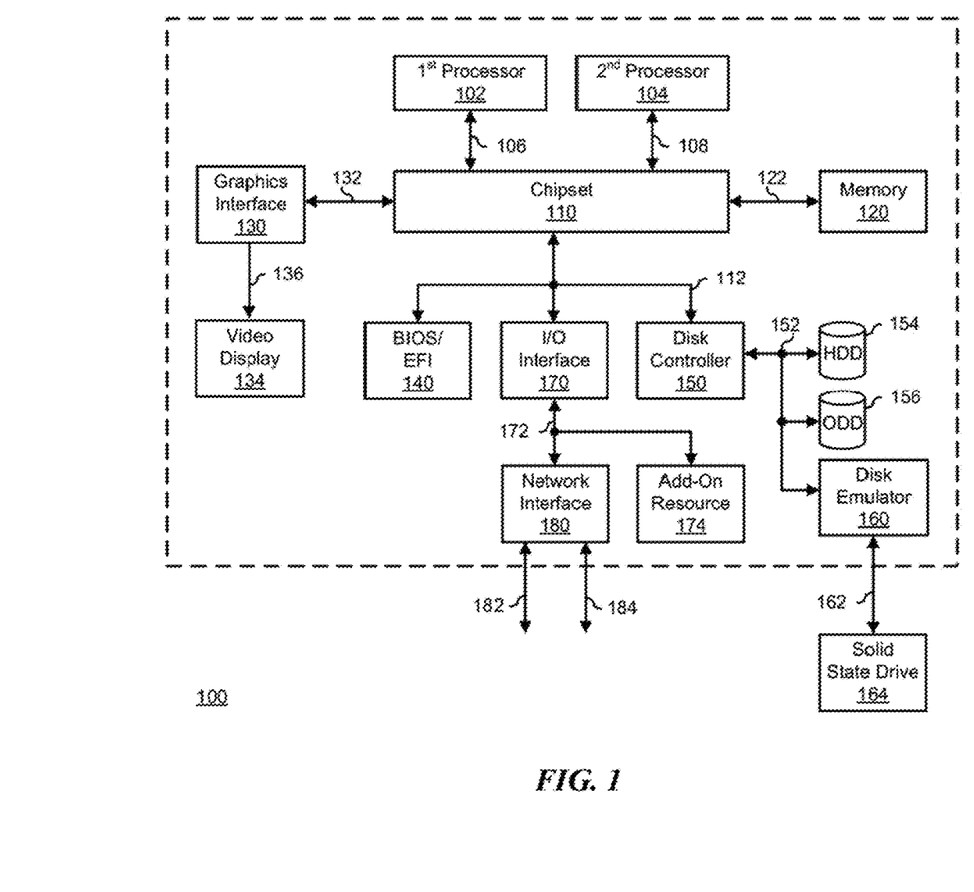
FIG. 1 is a block diagram illustrating an information handling system according to an embodiment of the present disclosure.

FIG. 1 illustrates a generalized embodiment of information handling system 100. Information handling system 100 has processors 102 and 104, a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniB and channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
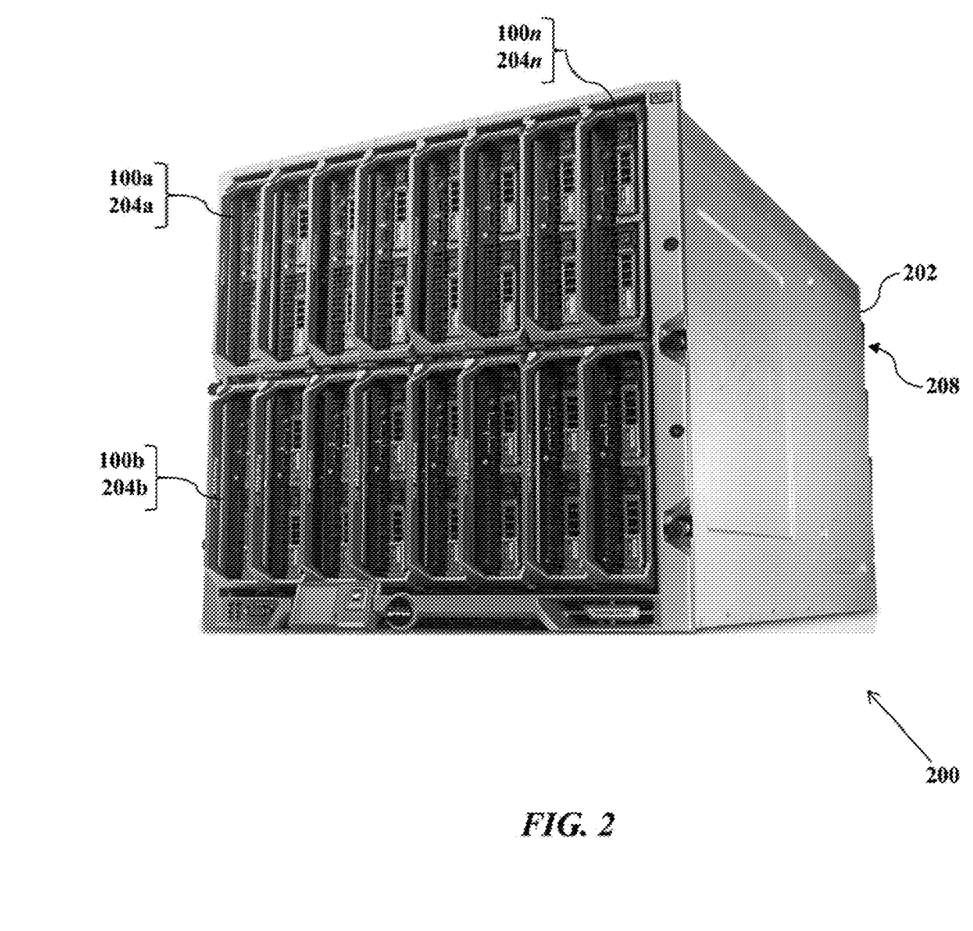
FIGS. 2-3 illustrate a server ecosystem, according to exemplary embodiments.
Figure 3:
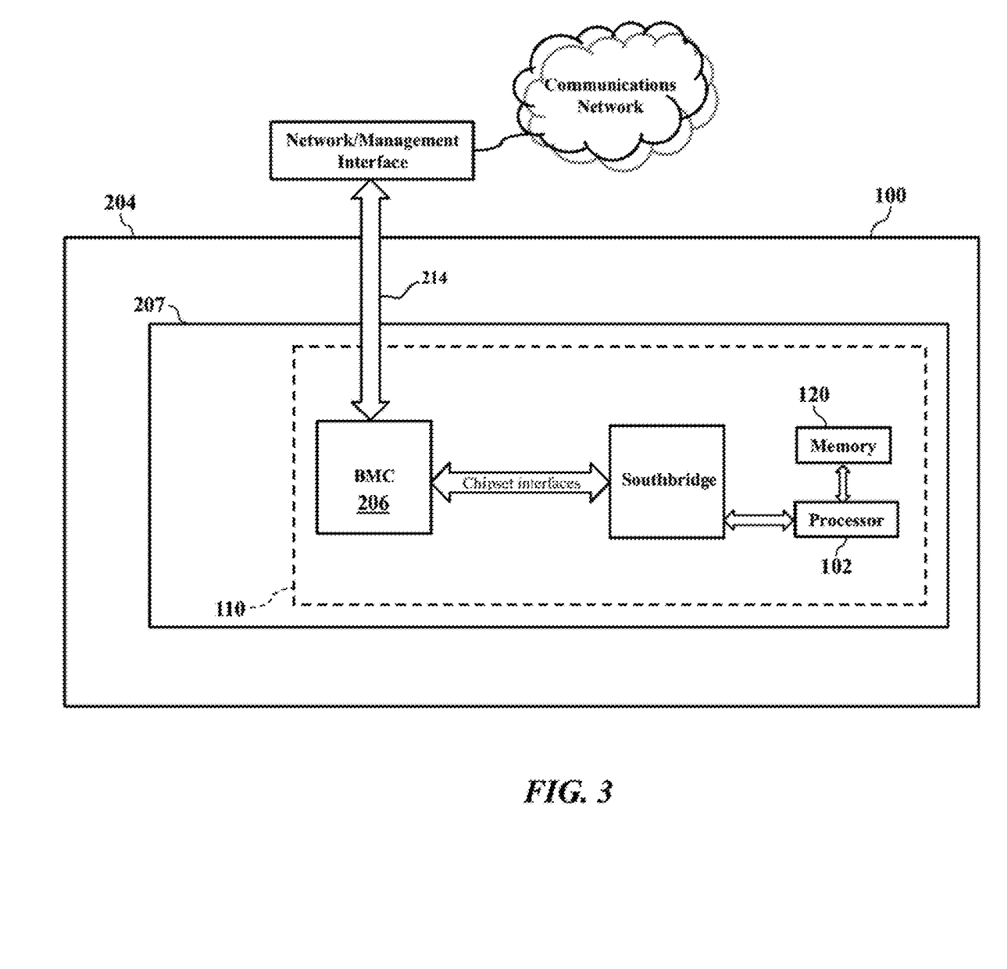

FIGS. 2-3 illustrate a blade server ecosystem 200, according to exemplary embodiments. The blade server ecosystem 200 has a common chassis 202 that houses or contains multiple ones of the information handling systems 100 (conventionally termed "blades or sleds" 204). As FIG. 3 best illustrates, each individual computing blade or sled 204 may have its own corresponding baseboard management controller 206. That is, each blade or sled 204 has a motherboard 207 comprising the chipset 110. As those of ordinary skill in the art understand, the baseboard management controller 206 has its own management processor and memory device, not shown for simplicity) that interfaces with the motherboard 207 to provide side-band and out-of-band remote management (perhaps according to the Intelligent Platform Management Interface specification). The baseboard management controller 206 has one or more physical communications links and interfaces to the motherboard 207, thus allowing the baseboard management controller 206 to process messages according to the IPMI specification. The baseboard management controller 206 may thus monitor and remotely report the functions and performance of the corresponding blade or sled 204 via a separate network interface to a communications network. The baseboard management controller 206 and the IPMI specification are generally well known and thus need not be explained in detail.

Returning to FIG. 2, the blade server ecosystem 200 may also have one or more chassis management controllers 208. Because the blade server ecosystem 200 may have many individual or separate blades or sleds 204a-n (such as sixteen (16), as FIG. 2 illustrates), the chassis management controller 208 may control or manage the individual and/or overall hardware and software resources. While the chassis management controller 208 may have any physical location, FIG. 2 illustrates the chassis management controller 208 accessible via a rear of the chassis 202. The individual blades or sleds 204 communicate with the chassis management controller 208 (perhaps via I/O interfaces, such as ISA, SCSI, $I^2C$, SPI, single wire, Ethernet, and/or USB). The blade server ecosystem 200 and its internal hardware and software components are generally well known, so the known details need not be explained in detail.

Figure 4:
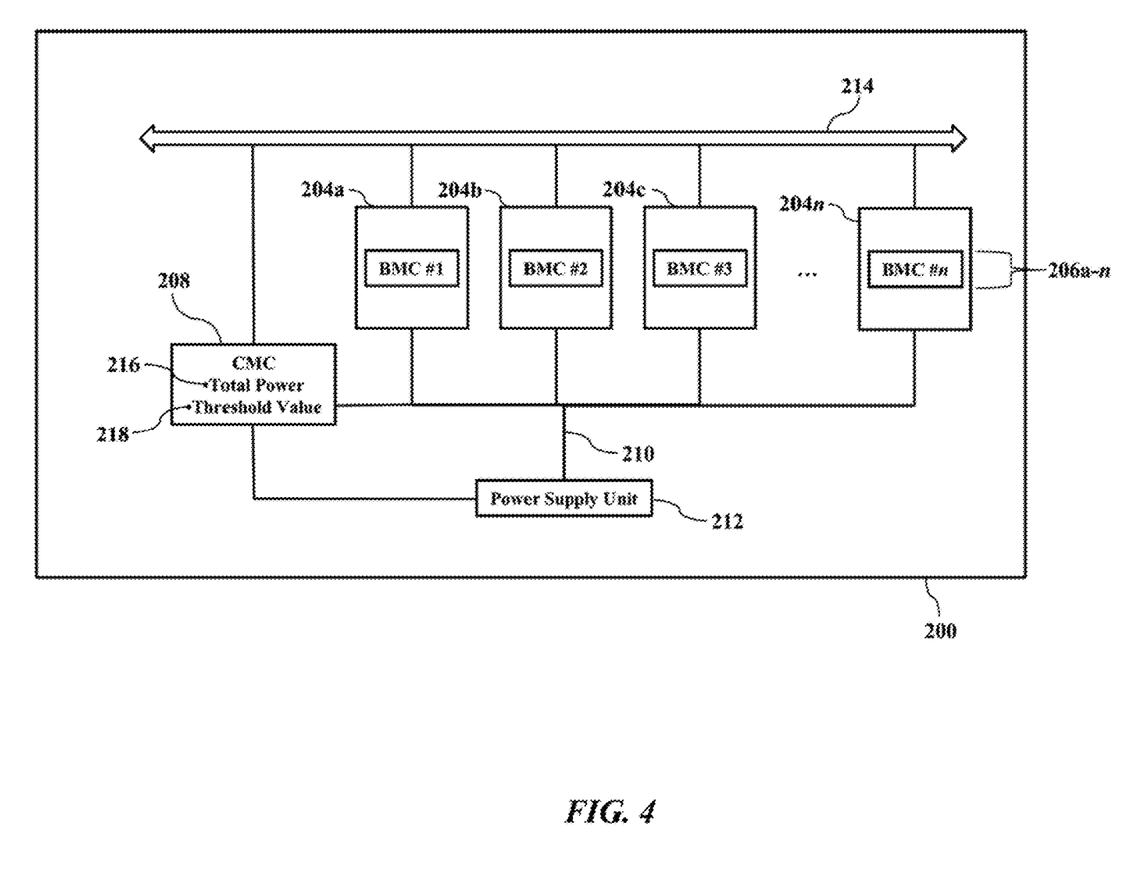
FIG. 4 is a simple illustration of power management, according to exemplary embodiments.

FIG. 4 is a simple illustration of power management, according to exemplary embodiments. Here the chassis management controller (CMC) 208 may manage the electrical power 210 consumed by the blades or sleds 204a-n. As the reader may understand, one or more power supply units 212 provide the electrical power 210 to the chassis management controller 208 and to the blades or sleds 204a-n.

The power supply unit 212 generally receives alternating current (such as that supplied by an electrical grid) or direct current electrical power and converts, produces, and/or supplies direct current electrical power (e.g., current and voltage) to the chassis management controller 208 and to the blades or sleds 204. Because the chassis management controller 208 communicates with the blades or sleds 204a-n (via an I/O interface 214, such as the management/network interface), the chassis management controller 208 may ensure that the power supply unit 212 can adequately provide enough electrical power 210. After all, if the blades or sleds 204a-n consume more electrical power 210 than the power supply unit 212 can safely provide, the entire blade server ecosystem may abruptly shut down, thus risking data loss.

The chassis management controller 208 may thus manage the electrical power 210. For example, the chassis management controller 208 may control the operation of the blades or sleds 204a-n. The chassis management controller 208, in particular, may predict a total amount 216 of the electrical power 210 that will be required for any one or more of the blades or sleds 204 to operate (as later paragraphs will explain). The chassis management controller 208 may then compare the total amount 216 of the electrical power 210 to a threshold value 218. The threshold value 218 is configurable and may represent a safe, maximum, and/or current operating power condition available from the power supply unit 212. If the power supply unit 212 can provide the total amount 216 of the electrical power 210, then the chassis management controller 208 may authorize any individual baseboard management controllers (BMC) 206a-n to power on its respective hardware and software resources. However, if an individual blade or sled 204, and/or a combination of the blades or sleds 204a-n, are predicted to consume more electrical power than the power supply unit 212 can safely provide, then the chassis management controller 208 may deny or not permit any or all of the individual baseboard management controllers 206a-n to power on their respective resources. In plain words, the total amount 216 of the electrical power 210 required by any blade or sled 204 must never exceed the threshold value 218 (perhaps representing an available capacity of the power supply unit 212). The chassis management controller 208 may thus not authorize any component to turn on or power up when a full chassis shutdown is at risk.

Figure 5:
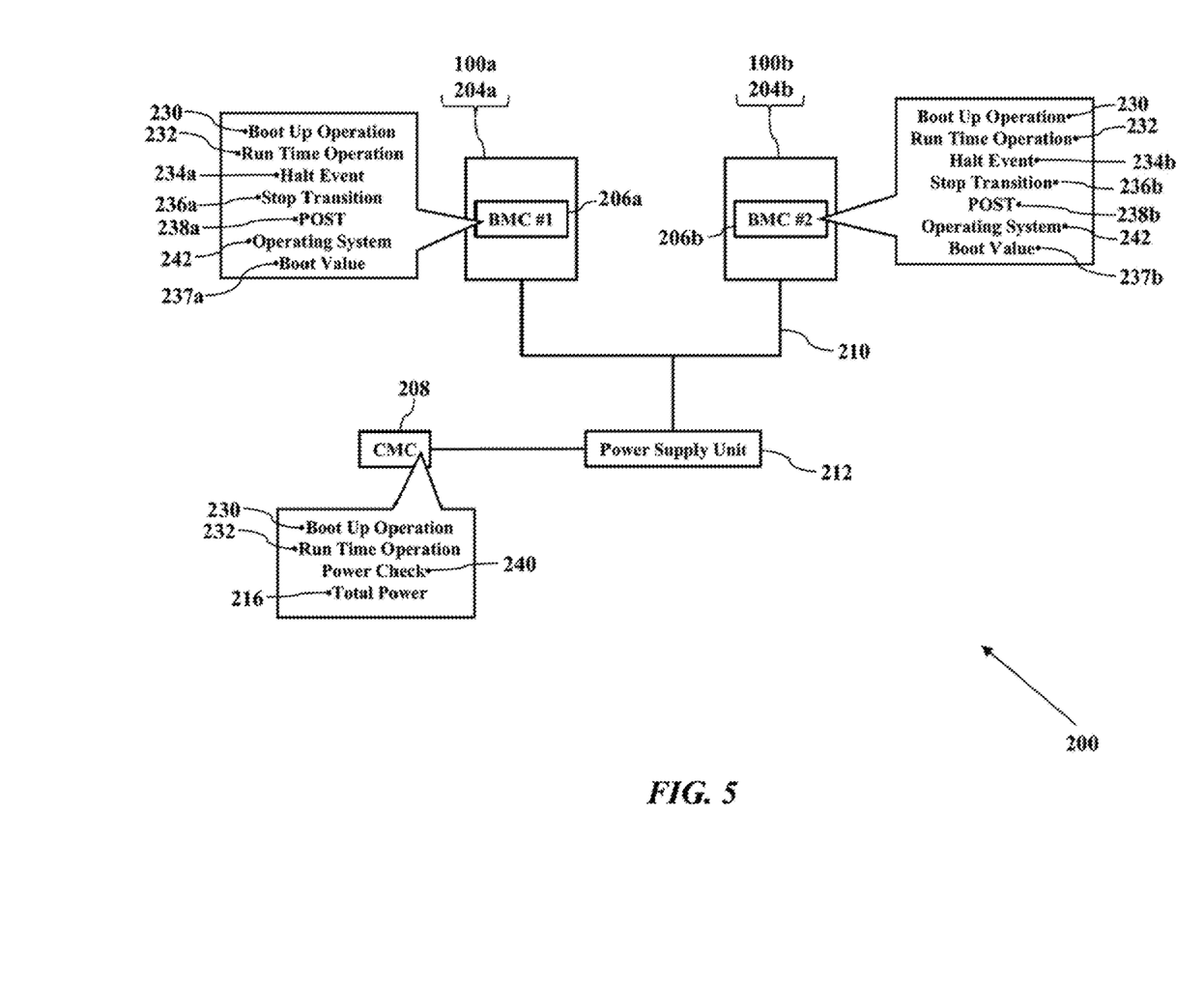
FIG. 5 is a simple illustration of a pre-power inventory, according to exemplary embodiments.
Figure 6:
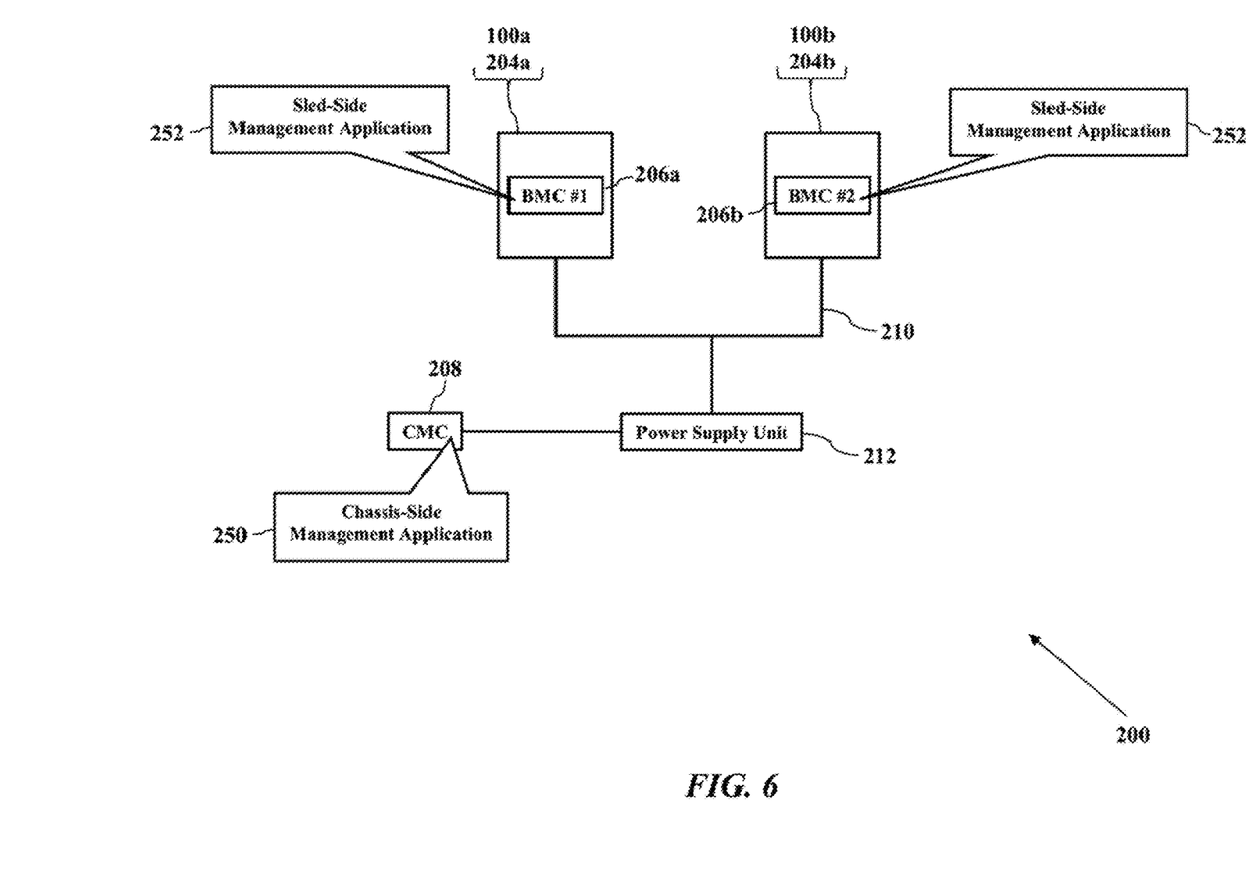
FIGS. 6-10 are more detailed illustrations of the pre-power inventory, according to exemplary embodiments.

FIG. 5 is a simple illustration of a pre-power inventory, according to exemplary embodiments. Here exemplary embodiments simply, but accurately, predict the electrical power 210 that will be required by any of the blades or sleds 204 before powering on. That is, before any individual blade or sled 204 powers up or on and consumes the electrical power 210, exemplary embodiments may first predict the total amount 216 of the electrical power 210 that will be required from the power supply unit 212. FIG. 5, for simplicity, only illustrates two blades or sleds 204a and 204b. In practice, though, there are commonly several or many blades or sleds 204 (as FIG. 2 illustrates). Regardless, the chassis management controller 208 may first only permit or command the baseboard management controllers (such as 206a and 206b) to power on, thus perhaps only consuming a minimal amount of the electrical power 210. The chassis management controller 208 and the baseboard management controllers 206a and 206b may then cooperate to predict the total amount 216 of the electrical power 210 that will be required from the power supply unit 212. The prediction is determined prior to the blades or sleds 204a and 204b initiating their respective full software and hardware capabilities and consuming full power.

Exemplary embodiments may separate a boot up operation 230 from a run time operation 232. That is, exemplary embodiments may establish or insert a halt event 234 as a logical statement, rule, programming, or processing step that implements a stop transition 236 from the boot up operation 230 to the run time operation 232. When any baseboard management controller 206 initially powers on, the chassis management controller 208 approves and allocates the electrical power 210 to the corresponding blade or sled 204 based on information available, which is limited prior to power on. Once the blade or sled 204 powers on, exemplary embodiments may update the allocation based on additional information being available. That is, exemplary embodiments may generate and implement an initial allocation that approves just enough of the electrical power 210 to initiate, execute, and/or complete a power on self-test (or POST) 238 for a given blade or sled 204a or 204b. Once the power on self-test 238 is executed, exemplary embodiments may gather more information to refine the allocation needed at run-time. The allocation for the run time operation 232 may go up or down. If the electrical power 210 for the run time operation 232 is calculated to increase in value, but the power supply unit 212 cannot provide the additional power to support a higher allocation, the chassis management controller 208 may halt the corresponding blade or sled 204a and/or 204b from transitioning from the boot up operation 230 to the runtime operation 232.

The chassis management controller 208 may thus only allocate a boot value 237 of the electrical power 210 that is required to complete one or more power on self-tests 238. As the baseboard management controllers 206a and 206b respectively execute the power on self-test 238, the chassis management controller 208 inventories the electrical power 210 that will be required by the blades or sleds 204a and 204b during the run time operation 232 (by communicating via the I/O interface 214 with the baseboard management controllers 206a and 206b). As the baseboard management controllers 206a and 206b respectively execute the power on self-test 238, the baseboard management controllers 206a and/or 206b perform a power check 240 that communicates a power allocation request to the chassis management controller 208 prior to allowing the baseboard management controllers 206a and 206b to boot and/or execute an operating system 242. The halt event 234, in other words, defines a check point or milestone for progressing from the boot up operation 230 to the run time operation 232. If the power supply unit 212 can provide the total amount 216 of the electrical power 210 predicted to be required during the run time operation 232, then the chassis management controller 208 may authorize the corresponding baseboard management controller 206a and/or 206b to boot and run the operating system 242, thus transitioning from the boot up operation 230 to the run time operation 232. However, if the power supply unit 212 cannot provide sufficient electrical power, then the chassis management controller 208 may halt or deny the run time operation 232 (such as by denying the run time allocation request). If the runtime allocation request for a particular baseboard management controller 206 is denied, the halt event 234 safely stops the corresponding blade or sled 204 from consuming more electrical power 210 and constrains power consumption within the allocation that was granted for the boot up operation 230.

Exemplary embodiments may thus only grant the boot up operation 230 when sufficient power is available. The chassis management controller 208 may confirm that there is sufficient remaining power capacity 210 to support the runtime operation 232 of an incremental blade or sled 204, thus granting the boot up operation 230. The boot up operation 230 only allows the baseboard management controllers 206 to power on and to run the power on self-test (POST) 238. Each blade or sled 204a and 204b may thus consume only a minimum amount of the electrical power 210 that is required to perform the power on self-test 238. As the chassis management controller 208 incrementally allows each baseboard management controller 206 to transition to the run time operation 232, the chassis management controller 208 maintains a running calculation of allocated power and compares to the available power capacity 210. In this way, the chassis management controller 208 ensures the sum value of the allocated power does not exceed the available capacity of the power supply unit 212.

FIGS. 6-10 are more detailed illustrations of the pre-power inventory, according to exemplary embodiments. The chassis management controller 208 (having its dedicated management processor and dedicated management memory device, not shown for simplicity) executes a chassis-side power management application 250 (perhaps stored in the dedicated management memory device). The chassis management controller 208 also interfaces with the baseboard management controllers 206a and 206b associated with each blade or sled 204a and 204b (perhaps via the interface 214, as FIG. 4 illustrates). Each baseboard management controller 206 also has a processor (not shown for simplicity) that executes a sled-side power management application 252 stored in a memory device (also not shown for simplicity). The chassis management controller 208 and the baseboard management controllers 206a and 206b (and thus the chassis-side power management application 250 and the sled-side power management application(s) 252) cooperate to configure and manage the operation of the power supply unit 212 and the consumption of the electrical power 210.

Figure 7:
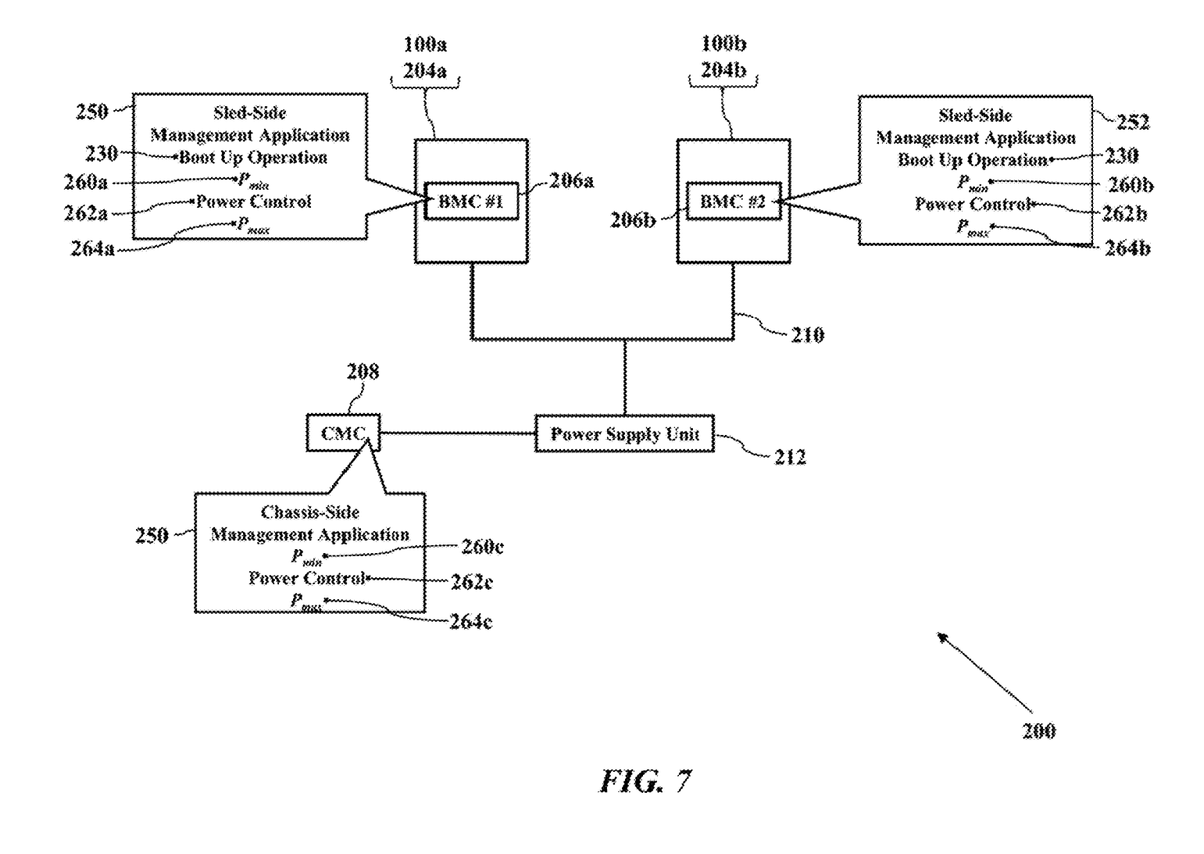

FIG. 7 illustrates an initial operation. When the blade server ecosystem 200 initially inventories the electrical power 210 (perhaps at a power on or reset), the chassis management controller 208 may first establish how much of the electrical power 210 is consumed by the blade server ecosystem 200 infrastructure (e.g., fans, chassis I/O modules, and inefficiencies). After the blade server ecosystem 200 accounts for its infrastructure power consumption, the chassis management controller 208 may send commands (perhaps via the interface 214, as FIG. 4 illustrates) to the baseboard management controllers 206a and 206b to allow them to request electrical power for operation at a minimum performance state (illustrated as $P_{min}$ 260a and $P_{min}$ 260b). The chassis management controller 208 may then check this power request against the remaining available sustained power capacity of the power supply unit(s) 210. If sufficient electrical power is available, the chassis management controller 208 may grant or authorize the requesting baseboard management controller 206a and 206b to proceed to the boot up operation 230. Once the baseboard management controller 206 receives a message, grant, and/or command to proceed or enter the boot up operation 230, the baseboard management controller 206 enters a minimum power booting state (illustrated as $P_{min}$ 260) while constraining the power consumption of the corresponding blade or sled 204 (such as the host processor 102/104 illustrated in FIG. 1 and any other significant power consuming components) to fit within, or consume below, the power value requested to the chassis management controller 208. If any blade or sled 204 and/or its processor lacks support for the minimum performance state 260 by default, then exemplary embodiments may configure a basic input output system (BIOS) to set the minimum performance state as early as possible (such as at initial power on). Regardless, once the BIOS initializes a power control (illustrated as 262a-c, such as CPU power consumption is capped at a running average power limit and the processor hot interrupt (PROCHOT #) is enabled), the BIOS may increase performance to a maximum performance state (illustrated as $P_{min}$ 264a-c). However, if at any time the chassis management controller 208 and/or the power supply unit 212 determines that the sustained power consumption 210 is exceeding the specified power supply limits, power controls such as running average power limits or PROCHOT # interrupts may be sent to all the blades or sleds 204 to reduce their individual and/or cumulative power consumption to the minimum performance state (illustrated as $P_{min}$ 260a and $P_{min}$ 260b). Because the BIOS flow may change with different processor generations, the check point (such as Intel's current privilege level CPL3 where power controls are initialized) may move in or out. BIOS will flow and timings may also be different, especially between different vendors of central processing units. Exemplary embodiments may thus be configured to provide input parameters that conservatively enforce and hold any processor to its minimum performance state 260a-c.

Figure 8:
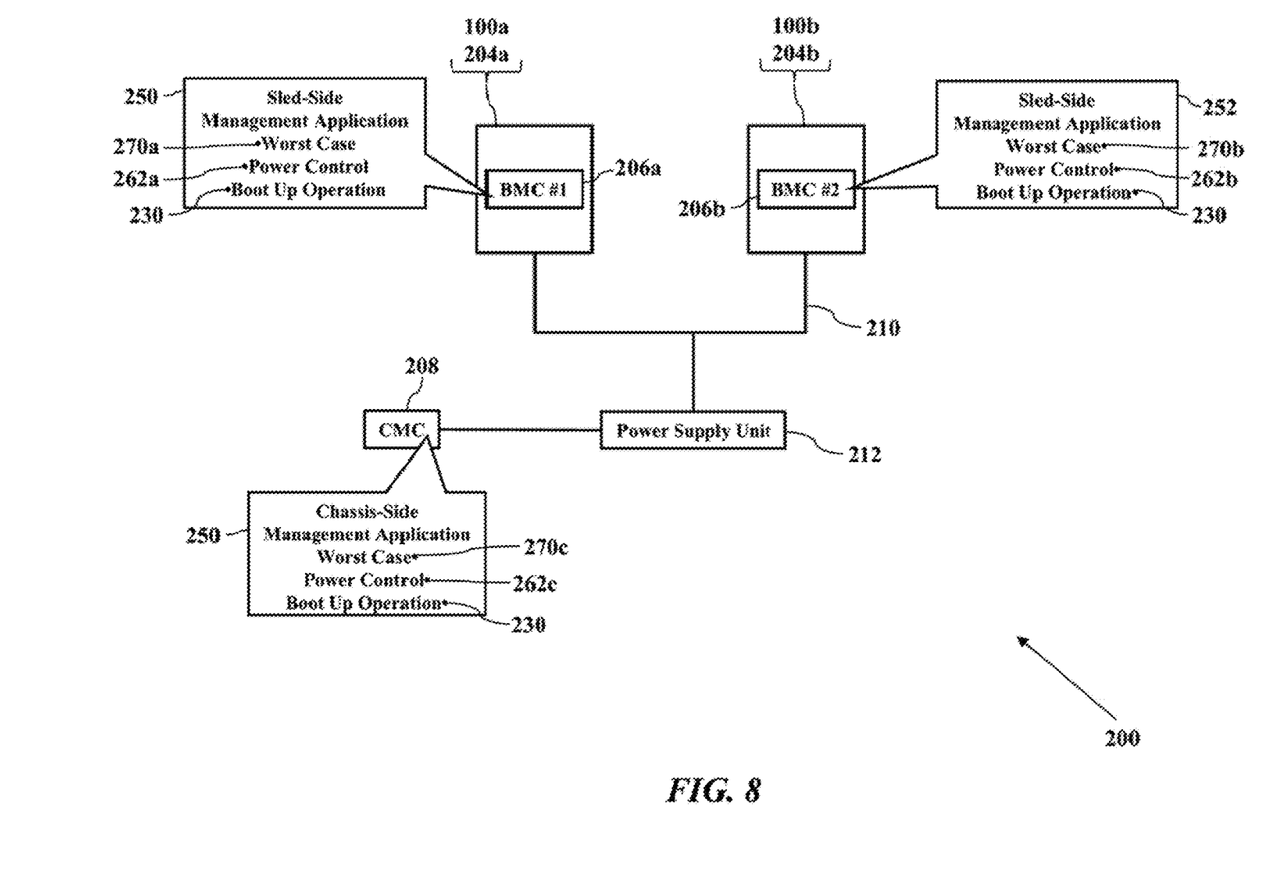

FIG. 8 illustrates worst case scenarios. Here exemplary embodiments populate worst case electrical power consumption information 270 to the baseboard management controllers 206. As the reader may understand, the blades or sleds 204 may have a wide variety of configurations (hardware components, different vendors, and different software resources). Each individual blade or sled (simply illustrated as 204a and 204b) may thus store electrical power consumption information based on an initial characterization or estimation. A platform identifier, for example, may be used to retrieve an initial allocation. Power allocations may be preconfigured or preloaded in the memory device of each baseboard management controller 206a and 206b. Power allocations may additionally or alternatively be downloaded via the Internet from some server or other network location. Regardless, exemplary embodiments may thus store the worst case electrical power consumption information 270a and 270b in each baseboard management controller 206a and 206b. The chassis management controller 208 may also store its corresponding worst case electrical power consumption information 270c. Moreover, exemplary embodiments need not characterize other power scenarios (such as low power and medium power consumption), thus reducing complexity and saving time, effort, and cost.

The worst case electrical power consumption information 270a-c is thus available prior to the power control 262a-c being initialized. Because each baseboard management controller 206a and 206b may thus pre-store its corresponding worst case electrical power consumption information 270a-b, this data is available during the boot up operation 230 (that is, prior to booting and executing the operating system 242, as earlier explained with reference to FIG. 5). Each baseboard management controller 206a-b may thus pre-store one or more electronic tables that electronically associate different operations and/or power levels (such as the boot power level 237, the boot up operation 230, and/or the run time operation 232 illustrated in FIG. 5) to their corresponding electrical power consumption (such as the worst case electrical power consumption information 270a-c in Watts). Again, exemplary embodiments may configure each baseboard management controller 206a-b with power data obtained from actual laboratory testing.

Figure 9:
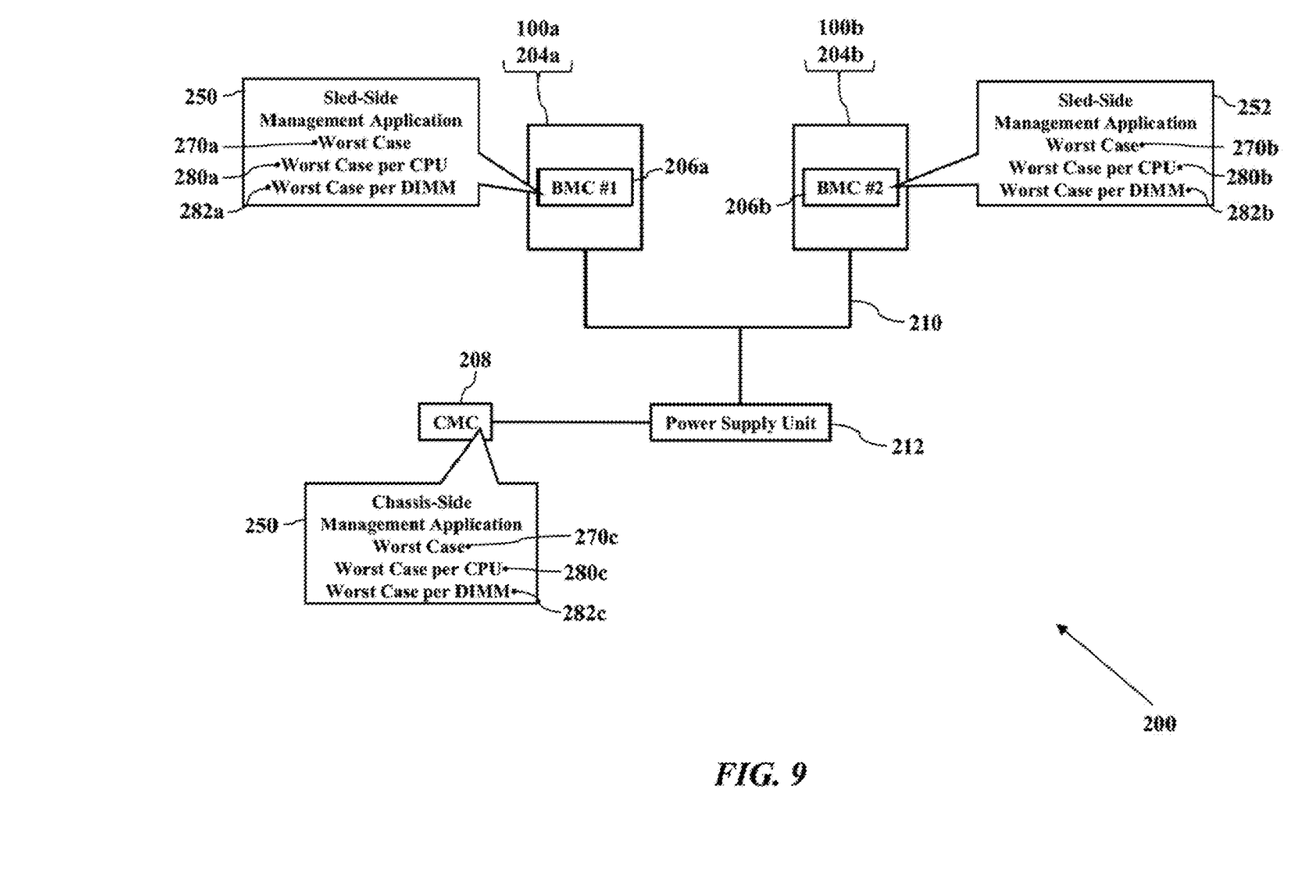

FIG. 9 illustrates other inventory schemes. As the reader may envision, experimental testing is time-consuming, laborious, and costly. Each different configuration of the blade or sled 204 must be built and tested to obtain its corresponding worst case electrical power consumption information 270. Exemplary embodiments may thus additionally or alternatively estimate electrical power consumption. For example, the worst case electrical power consumption information 270 may be based on the number of central processing units operating in each blade or sled 204. As the number of central processing units increases, greater electrical power will be required. Each baseboard management controller 206 may thus pre-store the number of central processing units and/or generate a sum total. Regardless, a worst case power consumption per CPU 280 may be multiplied by the number of central processing units to generate the worst case electrical power consumption information 270 for the corresponding blade or sled 204. The baseboard management controller 206 may thus store this data for power management analysis.

Power consumption may also be based on memory. Each blade or sled 204 may have one or more dual in-line memory modules (or DIMMs). As the number of DIMMs increases, greater electrical power will be required. Each baseboard management controller 206 may thus pre-store the number of DIMMs and/or generate a sum total of the DIMMs. Regardless, a worst case power consumption per DIMM 282 may be multiplied by the number of DIMMs to generate the worst case electrical power consumption information 270 for the corresponding blade or sled 204. The baseboard management controller 206 may again store this data for power management analysis.

Figure 10:
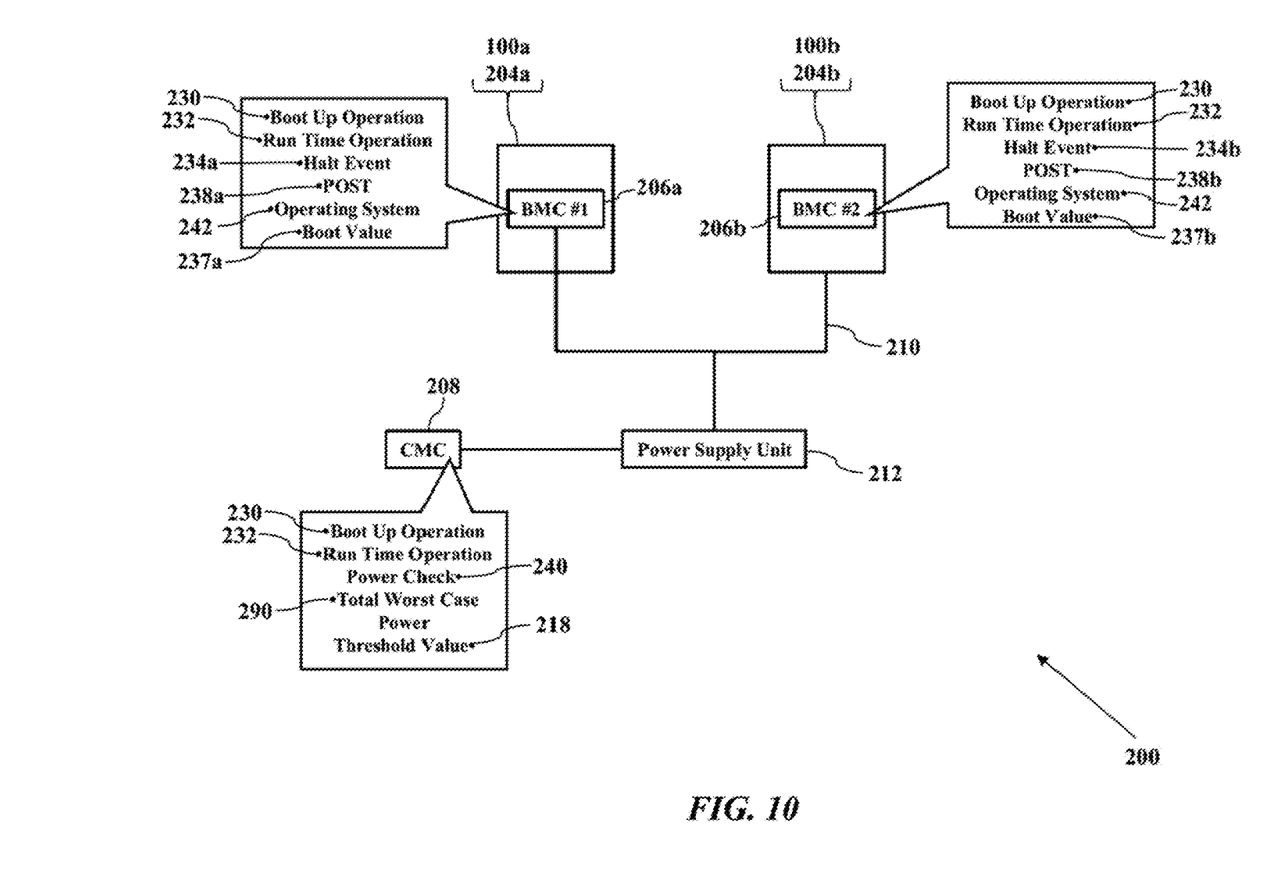

FIG. 10 illustrates the halt event 234. Exemplary embodiments use the power inventory during the boot up operation 230 and/or the power on self-test 238 of each blade or sled 204 to budget or allocate the electrical power 210. Each baseboard management controller 206 may only request the worst case boot power as part of its initial request to the chassis management controller 208. This is the minimum incremental electrical power that is required to complete the power on self-tests (POST) 238a-b. As each baseboard management controller 206 executes the power on self-test 238, the baseboard management controller 206 gathers more information about its own configuration and may make a second or subsequent request to the chassis management controller 208 for the electrical power 210 required for the Run Time Operation 232. The chassis management controller 208, for example, may keep a running sum of all the electrical power consumption information (perhaps for any individual, combination, or all of the blades or sleds 204) to generate a total worst-case power requirement 290. The chassis management controller 208 may then compare the total worst-case power requirement 290 to the threshold value 218. The threshold value 218 represents some upper or maximum limit on the electrical power 210 that can be safely provided by the power supply unit 212. If the total worst-case power requirement 290 is less than the threshold value 218, then the power supply unit 212 can safely operate without shutdown and/or overheating. The chassis management controller 208 may thus authorize power allocation requests received from any baseboard management controller 206 at any given time, regardless of whether the boot up operation 230 was requested or the run time operation 232 was requested. However, if the power supply unit 212 cannot provide sufficient electrical power to satisfy the total worst-case power requirement 290, then the chassis management controller 208 may deny a power allocation request by any baseboard management controller 206. For example, if the power allocation request was for the boot up operation 230, then the chassis management controller 208 may instruct or command the baseboard management controller 206 to prevent boot up and, instead, remain in an ACPI S5 "off" state. If the power allocation request was for the run time operation 232, then the chassis management controller 208 may instruct or command the baseboard management controller 206 to generate and/or execute the halt event 234 that prevents the operating system 242 from loading and/or executing.

The halt event 234 may thus act as a power milestone associated with each blade or sled 204. If the chassis management controller 208 determines that there is insufficient electrical power for any blade or sled 204 for the transition 236 to the run time operation 232, then the chassis management controller 208 may deny the power allocation requested by the corresponding baseboard management controller 206. When the baseboard management controller 206 receives a run time power allocation denial sent from the chassis management controller 208, the halt event 234 stops the power on self-test 238 for that same blade or sled 204, thus constraining its power allocation and/or consumption to the boot up operation 230 previously granted. The operating system 242 never boots, thus preventing the transition 236 to the run time operation 232. The halt event 234, in other words, locks the corresponding blade or sled 204 in the boot up operation 230. The boot up operation 230 may also allow the chassis management controller 208 (and the baseboard management controllers 206a-b) to communicate (via a communications network, such as the Internet) with a remote administrator. However, the halt event 234 acts as a gatekeeper to confine or to prevent the run time operation 232 when the electrical power 210 is lacking. The halt event 234 thus defines an end point for the transition 236 from the boot up operation 230 to the run time operation 232 (and perhaps the total worst-case power requirement 290).

The halt event 234 may thus be a "go" or "no-go" decision. Even though the chassis management controller 208 grants a baseboard management controller 206 to request to power on and/or boot, the chassis management controller 208 may only approve processing to the halt event 234. If the power supply unit 212 can support the total worst-case power requirement 290, then the chassis management controller 208 grants the run time power allocation request to the baseboard management controller 206 and its blade or sled 204 enters the run time operation 232 and the operating system 242 boots as normal. But if the power supply unit 212 cannot supply the total worst-case power requirement 290, the chassis management controller 208 does not grant the run time power allocation request to the baseboard management controller 206 and the blade or sled 204 does not boot and execute the operating system 242. The operation of the blade server ecosystem 200 is safely confined to the available capacity of the electrical power 210. The risk of a chassis shutdown is eliminated.

Exemplary embodiments thus present an elegant solution. Conventional power management uses inaccurate and complex pre-power budgeting schemes. The conventional power management schemes are complex and result in numerous bugs and customer issues. Exemplary embodiments, though, present a much simpler design which only allocates electrical power that the blade or sled 204 needs to progress to the halt event 234. The halt event 234 is thus a processing milestone that bounds the power on self-test 238 to its end or completion. As the power on self-test 238 is in progress, exemplary embodiments involve the baseboard management controller 206 requesting power for the run time operation 232 from the chassis management controller 208 prior to booting and/or executing the operating system 242. In exemplary embodiments, the baseboard management controller 206 need only consult or lookup the worst case electrical power consumption information 270 for the blade or sled 204 in which it is installed. No detailed inventory of power consuming components need be performed prior to the host powering on.

Exemplary embodiments are more accurate. BIOS enforces the minimum performance state 260 during the POST 238 until the power control 262 is initialized. Worst-case power requirements are characterized in engineering labs and stored as table-driven boot power lookup values. Subsequent end of boot power checks and halts are implemented. This solution significantly reduces design, implementation, and validation complexities while providing increased accuracy over current implementations. While even higher accuracies are possible for pre-power-on power estimates, the complexity levels have been too high to justify investment.

Exemplary embodiments are backwards-compatible. The chassis-side power management application 250 and the sled-side power management application 252 may be updated to implement the halt event 234. Older computers may download a version of the chassis-side power management application 250 and/or the sled-side power management application 252 that includes the halt event 234. A remote administrator, for example, may instruct or command legacy servers to query a network resource to retrieve recent software and/or firmware that implements the halt event 234. As the blade server ecosystem 200 may include a mixture of blades or sleds 204 by model and/or manufacturer, some of the blades or sleds 204 may support the halt event 234 and other blades or sleds 204 may use a legacy method of power control.

Figure 11:
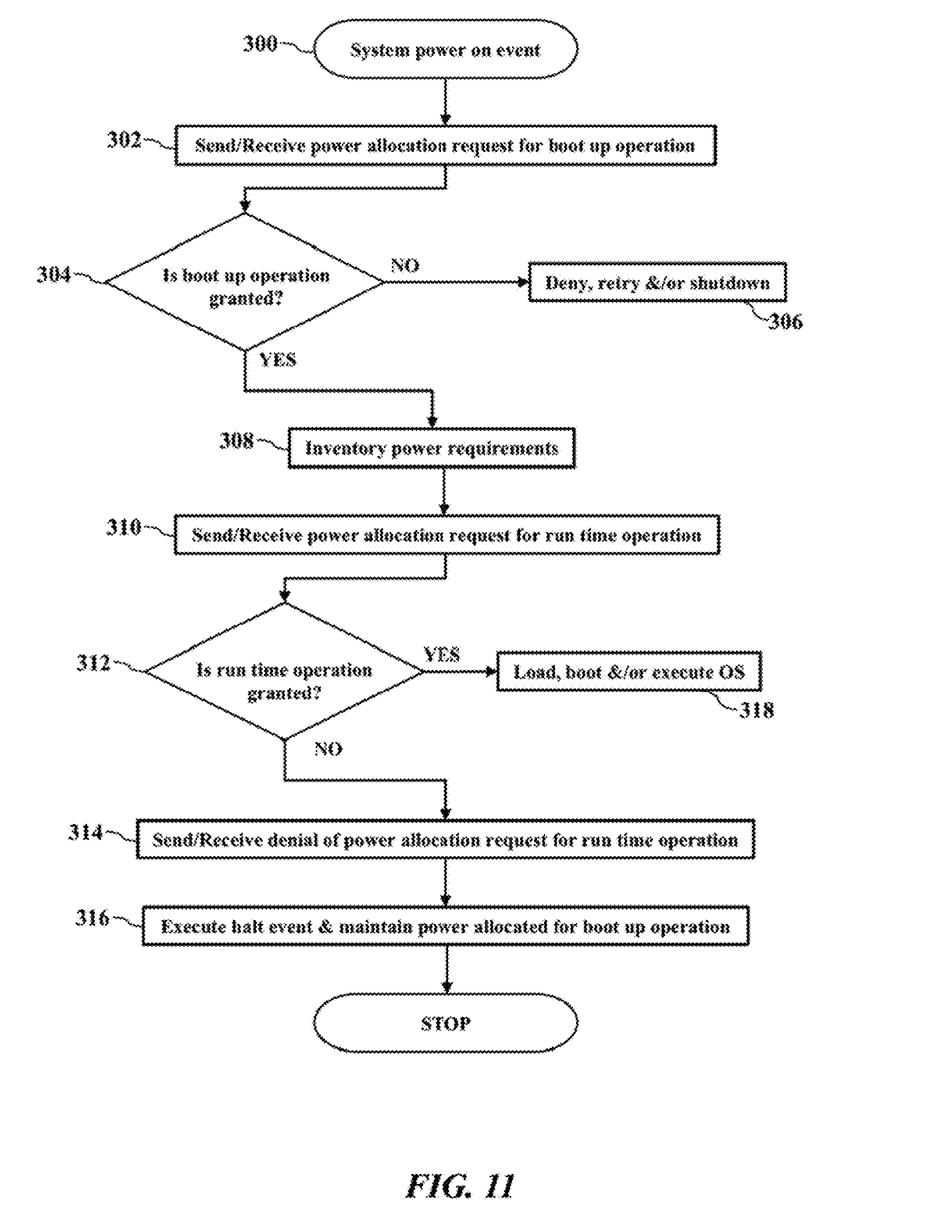
FIG. 11 is a flowchart illustrating a method or algorithm for power management, according to exemplary embodiments.

FIG. 11 is a flowchart illustrating a method or algorithm for power management, according to exemplary embodiments. FIG. 11 illustrates the method or algorithm from the perspective of an individual blade or sled 204 that progresses through power on stages. Because the blade server ecosystem 200 may have many blades or sleds 204, the steps illustrated in FIG. 11 may be performed, progressed, or executed in parallel or asynchronously by one or more of the blades or sleds 204. The information handling system 100 (such as the blade server ecosystem 200) detects a power on event to receive the electrical power 210 (e.g., current and voltage) (Block 300). Each baseboard management controller (BMC) 206 sends an initial or first power allocation request to the chassis management controller 208 to initiate the boot up operation 230 at the boot value 237 of the blade or sled's 204 power consumption (Block 302). If the power supply unit 212 cannot provide sufficient incremental power to support the power allocation request (Block 304), the chassis management controller 208 denies the baseboard management controller's 206 power allocation request for the boot up operation 230 and the information handling system 100 retries or shuts down (Block 306). However, if the power supply unit 212 can provide the boot value 237, the chassis management controller 208 grants the power allocation request for the boot up operation 230 (Block 304). The individual, requesting baseboard management controller 206 then inventories its power requirements for the run time operation 232 (Block 308). Once the power inventory is completed (such as during the POST 238), the baseboard management controller 206 may submit a second or subsequent power allocation request to the chassis management controller 208 for the run time operation 232 (Block 310).

The chassis management controller 208 compares the capacity of the electrical power 210 available from the power supply unit 212, plus the incremental electrical power 210 required for the run time operation 232 to the threshold value 218. If the power supply unit 212 cannot provide the incremental electrical power 210 required for the run time operation 232 (Block 312), then the chassis management controller 208 denies the second or subsequent power allocation request for the run time operation 232 (Block 314). When the baseboard management controller 206 receives the denial, the baseboard management controller 206 triggers the halt event 234 and maintains the boot up operation 230 at the boot value 237 of power consumption (Block 316). If the power supply unit 212 can provide the incremental electrical power 210 required for the run time operation 232 (Block 312), then the chassis management controller 208 grants the second or subsequent power allocation request for the run time operation 232, thus preventing the halt event 234 and allowing the baseboard management controller 206 to boot, load, or execute the operating system 242 (Block 318).

The halt event 234 may thus represent decisional programming. A power inventory is performed and then a run-time power budget is calculated for each blade or sled 204. Exemplary embodiments may then add or sum the individual run-time power budgets to obtain a total chassis power budget. The chassis management controller 208 compares the total chassis power budget (perhaps the total worst-case power 216) to the threshold value 218 (perhaps representing the available PSU capacity). If the check fails, any blade or sled 204 may be denied its power allocation requests.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    granting a baseboard management controller to enter a boot up procedure that executes a power on self-test;
    receiving a request from the baseboard management controller for a run time operation at which an operating system is executed;
    predicting a run time value of an electrical power needed by the baseboard management controller for the run time operation;
    denying the request from the baseboard management controller for the run time operation in response to the run time value of the electrical power being greater than an available electrical power that is available from a power supply unit; and
    executing a halt event that prevents the baseboard management controller from transitioning from the boot up procedure to the run time operation at which the operating system is executed.

2. The method of claim 1, further comprising comparing a threshold value to the run time value of the electrical power needed by the baseboard management controller for the run time operation.

3. The method of claim 1, further comprising maintaining the baseboard management controller at a boot value associated with the boot up procedure.

4. The method of claim 1, further comprising granting the baseboard management controller to consume the electrical power needed for the boot up procedure.

5. The method of claim 1, further comprising sending a denial via an interface to the baseboard management controller, the denial denying the request from the baseboard management controller for the run time operation.

6. The method of claim 1, further comprising maintaining the baseboard management controller at a power consumption associated with the boot up procedure.

7. The method of claim 1, further comprising determining the run time value of the electrical power needed by the baseboard management controller based on at least one of a number of central processing units and the number of dual inline memory modules.

8. A server ecosystem, comprising:
    a hardware processor; and
    a memory device accessible to the hardware processor, the memory device storing instructions that when executed cause the hardware processor to perform operations including:
        granting a request from a baseboard management controller for an electrical power associated with a boot-up operation that executes a power on self-test;
        receiving a subsequent request from the baseboard management controller for a run time operation at which an operating system is executed;
        predicting a run time value of the electrical power needed by the baseboard management controller for the run time operation;
        determining the run time value of the electrical power needed by the baseboard management controller for the run time operation exceeds an available electrical power that is available from a power supply unit; and
        sending a denial that causes the baseboard management controller to execute a halt event, the halt event preventing the baseboard management controller from transitioning from the boot up procedure to the run time operation at which the operating system is executed.

9. The server ecosystem of claim 8, wherein the operations further include comparing a threshold value to the run time value of the electrical power needed by the baseboard management controller for the run time operation.

10. The server ecosystem of claim 8, wherein the operations further include approving a boot value of the electrical power associated with the boot up procedure.

11. The server ecosystem of claim 8, wherein the operations further maintaining the baseboard management controller at the boot value associated with the boot up procedure.

12. The server ecosystem of claim 8, wherein the operations further include sending the denial via an interface to the baseboard management controller.

13. The server ecosystem of claim 8, wherein the operations further include determining the run time value of the electrical power needed by the baseboard management controller based on a number of central processing units.

14. The server ecosystem of claim 8, wherein the operations further include determining the run time value of the electrical power needed by the baseboard management controller based on a number of dual inline memory modules.

15. A memory device storing instructions that when executed cause a hardware processor to perform operations, the operations comprising:
   granting a request from a baseboard management controller for an electrical power associated with a boot-up operation that executes a power on self-test;
   receiving a subsequent request from the baseboard management controller for a run time operation at which an operating system is executed;
   predicting a run time value of the electrical power needed by the baseboard management controller for the run time operation;
   determining the run time value of the electrical power needed by the baseboard management controller for the run time operation exceeds an available electrical power that is available from a power supply unit; and
   sending a denial that causes the baseboard management controller to execute a halt event, the halt event preventing the baseboard management controller from transitioning from the boot up procedure to the run time operation at which the operating system is executed.

16. The memory device of claim 15, wherein the operations further include comparing a threshold value to the run time value of the electrical power needed by the baseboard management controller for the run time operation.

17. The memory device of claim 15, wherein the operations further include approving a boot value of the electrical power associated with the boot up procedure.

18. The memory device of claim 15, wherein the operations further include maintaining the baseboard management controller at the boot value associated with the boot up procedure.

19. The memory device of claim 15, wherein the operations further include sending the denial via an interface to the baseboard management controller.

20. The memory device of claim 15, wherein the operations further include determining the run time value of the electrical power needed by the baseboard management controller based on at least one of a number of central processing units and the number of dual inline memory modules.

* * * * *